June 18, 1957 W. K. GANNETT 2,796,010
EXPOSURE TIMING DEVICE FOR CAMERAS
Filed Feb. 1, 1952 3 Sheets-Sheet 1
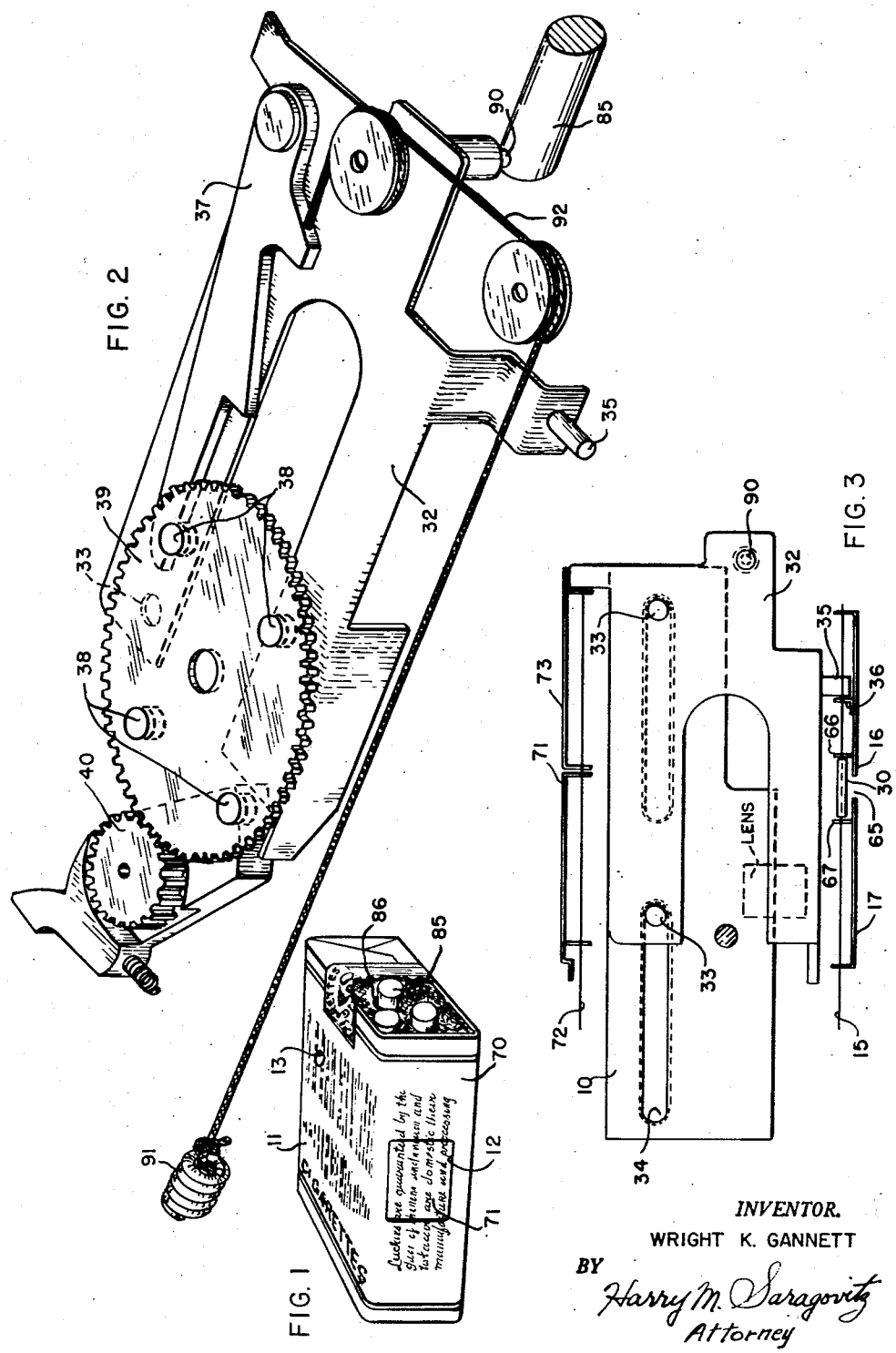
INVENTOR.
WRIGHT K. GANNETT
BY
Harry M. Saragovitz
Attorney

INVENTOR.
WRIGHT K. GANNETT

June 18, 1957
W. K. GANNETT
2,796,010
EXPOSURE TIMING DEVICE FOR CAMERAS
Filed Feb. 1, 1952
3 Sheets-Sheet 3
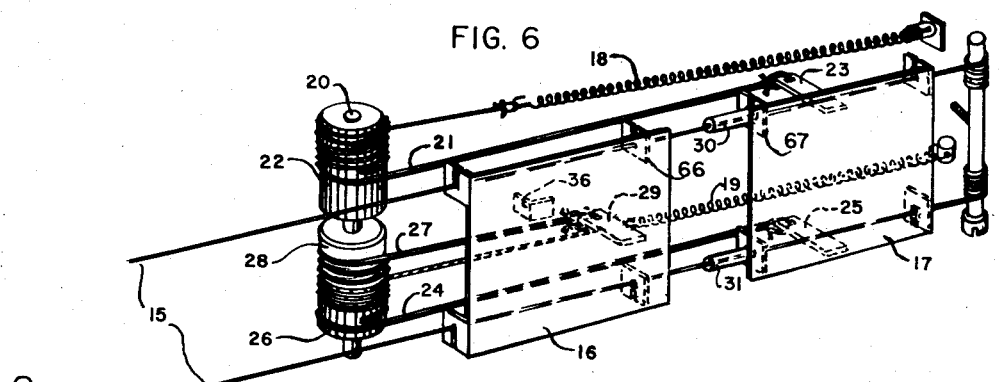
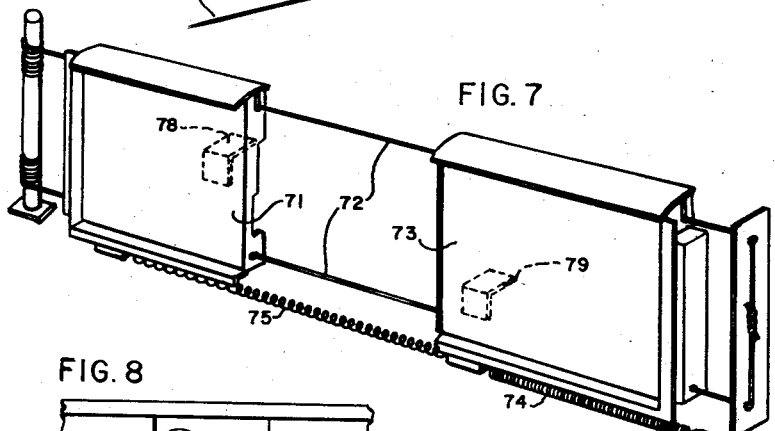
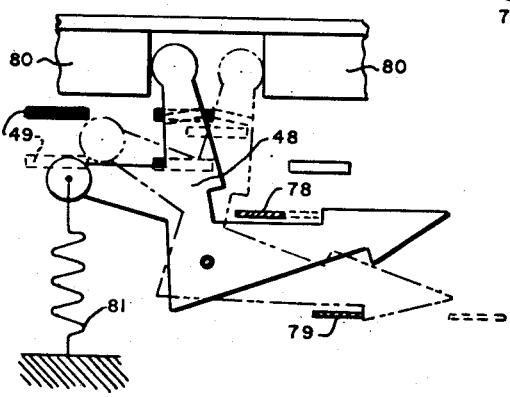
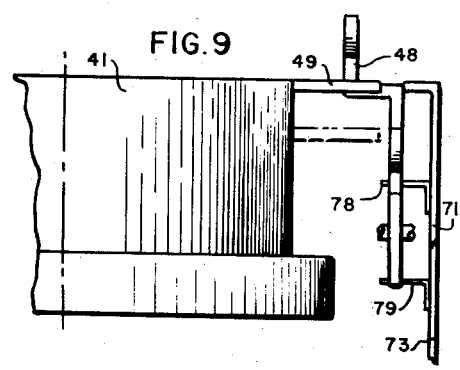
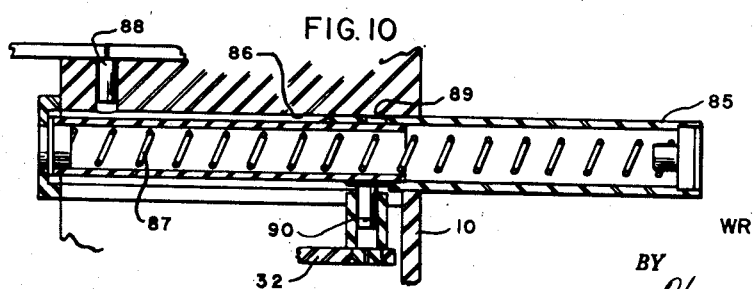
INVENTOR.
WRIGHT K. GANNETT
BY
*Harry M. Saragovitz*
Attorney

United States Patent Office 2,796,010
Patented June 18, 1957

2,796,010

EXPOSURE TIMING DEVICE FOR CAMERAS

Wright K. Gannett, Davenport, Iowa, assignor to the United States of America as represented by the Secretary of the Army Application February 1, 1952, Serial No. 269,425

13 Claims. (Cl. 95—53)

This invention relates to means for timing the shutter of photographic cameras and is particularly adapted to sub-miniature cameras the design of which permits them to be inclosed in an extremely small space. However, the principles involved may be applied to any camera.

The timing mechanism constituting the subject matter of this invention lends itself particularly to a specific type of shutter having two elements movable in a substantially flat plane. When the camera is set for taking a picture one of the moving elements is positioned to close the film aperture. To operate the shutter both of the light controlling elements are under spring tension and normally held stationary by a pair of latches. To operate the shutter the latches are released successively, one latch acting to release that element which normally closes the film aperture thus opening the lens and exposing the sensitive material. Subsequently, at the end of the exposure period the second light controlling member is released by a second latch thus closing the shutter.

The above shutter is described herein in connection with the novel timing mechanism as a practical means for executing the exposure cycle in connection with the invention.

To introduce the principles of the invention a brief description thereof is as follows. The timing element proper consists of an inertia device which under the broad aspects of the invention may be any freely movable body having a substantial inertia. A practical and desirable inertia device, however, is that of a revolving member preferably in the form of a disc revolving on a central pivot shaft. The disc also is allowed to travel axially along the shaft. A preloaded spring supplies the power for rotating the disc, the motion of which is normally stopped by a stop device having a rotationally fixed position with respect to the disc. The selection of the desired time period is obtained by actuating one of a plurality of shutter release buttons projecting thru the camera case. Each of these buttons is in position to engage a stop device on the inertia disc.

To operate the shutter one of these buttons is depressed which results in moving the disc axially along its shaft until it disengages from a stop and starts to rotate. After the disc is rotated a fraction of one complete revolution another stop means on the disc which coacts with the selected shutter release button stops the rotation of the disc. The release button is then allowed to return to its normal position, the effect of which is to again release the said disc which continues to rotate in the same direction until it again engages its fixed stop device.

The inertia disc is provided with a plurality of ears projecting from its peripheral portion which engage a pair of shutter controlling latches. As above pointed out the time period between which these two latches are actuated determines the exposure interval. The projections on the disc coact with each latch to measure the exposure period in a manner described in detail hereinafter.

It is a primary object of the invention to provide a highly efficient exposure timing means having maximum ruggedness and simplicity of design.

It is a further object to provide a shutter mechanism which lends itself readily to miniaturization for use in extremely small cameras.

A still further object of the invention is to provide a means for accurately controlling exposures in conjunction with highly efficient and consistent light controlling means.

Other objects and features of the invention will more fully appear in connection with the following description and will be particularly pointed out in the claims.

To present a better understanding of the invention a particular form of the invention will be described and illustrated in the accompanying drawings in which:

Fig. 1 is a perspective view of a camera embodying the invention.

Fig. 2 is a perspective view of the resetting element of the camera.

Fig. 3 is a plan view of the resetting means showing the relative position of the camera shutter and lens capping means with respect thereto.

Fig. 6 is a perspective view of the shutter used in connection with the invention showing the light controlling gates partly open.

Fig. 7 is a perspective view of the automatic lens capping means for the camera in open position.

Fig. 8 is a side elevation of the means for controlling the lens capping means.

Fig. 9 is an end elevation of the elements shown in Fig. 8.

Fig. 10 is a cross-sectional view of the manually actuated means for resetting the active elements of the camera.

Figure 4:
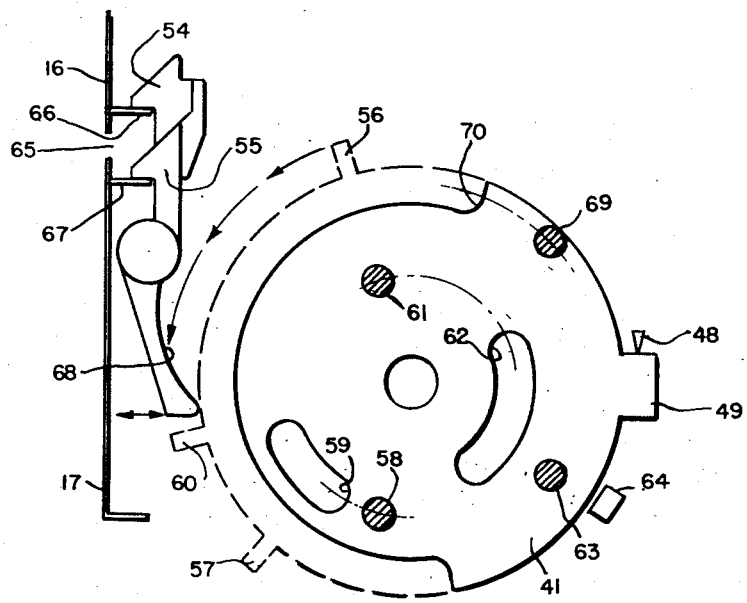
Fig. 4 is a diagrammatic view illustrating the exposure timing elements.

The present invention may be employed for timing shutters for any type of still camera. It will be herein described in connection with a subminiature camera which may be employed secretly or for espionage usage The camera body 10 is made to fit within the outer wrappings of a standard cigarette package 11.

The camera is provided with two openings only, an opening 12 for the lens and an exposure counter window 13. Actuation of the various elements of the camera may be accomplished in any convenient way such as by movement of dummy cigarettes which are extensible from the confines of the package and the movements of which may be used for film transport, shutter cocking, etc. The focusing means for the lens may be conventional as may also the film transport device and the adjustment of the light controlling iris.

The timing device which is the subject of this invention is of special construction and functions in connection with a shutter having a pair of light controlling gate members which are movable in a straight line across the focal plane of the lens. Desirably, these two gate members are arranged to move upon a pair of tightly stretched parallel steel wires 15 anchored in the camera body. The gate members are provided with flanges thru which the guide wires are fed. Thus the gate members are provided with a substantially frictionless guiding means.

As shown in Fig. 3 the shutter elements or gates 16 and 17 are in the position they assume at the end of an exposure cycle and prior to reset. At this time the gate 17 is closing the lens aperture. The gate elements 16 and 17 are provided with their own source of power in the form of coil springs 18 and 19. These springs and their associated elements are best shown in Fig. 6. One end of each spring is anchored in a fixed position to the camera body while the other ends of the springs are connected to flexible cords which are wrapped around a system of idler sleeves which are mounted for rotation upon a shaft 20 secured in the camera frame and the other ends of these cords are secured respectively to the elements 17 and 16 of the shutter.

The spring 18 is connected to and actuates the element 17 thru the cord 21 which is wrapped around a sleeve 22 on the shaft 20. To insure smooth operation of the element 17 it is desirably driven by the spring 18 at two points, the cord 21 being connected to the upper margin thereof at 23 while another cord 24 is connected to the member 17 at 25. The cord 24 is wrapped around another sleeve 26 of the same diameter as the sleeve 22. The sleeves 22 and 26 are secured to the shaft 20 and revolve with it. Thus, spring 18 acts to drive the member 17.

The spring 19 has connected thereto a cord 27 which is wrapped around a sleeve 28 loosely mounted on shaft 20, the other end of the cord 27 being connected to the shutter element 16 at 29.

Desirably, the shutter element driving cords are received in spiral grooves in their respective sleeves. These grooves are so arranged that thruout the operation of the shutters those portions thereof which are connected to the shutter elements will be entirely outside of the format of the camera. The springs 18 and 19 are also positioned away from the camera format by proper location of their points of connection with the cords 21 and 27.

It will be noted from Fig. 3 and Fig. 6 that the elements 16 and 17 are held apart a short distance by spacers 30 and 31 which may desirably be made of some resilient material such as rubber threaded upon the supporting wires. The purpose of the spacers will become apparent hereinafter.

As above stated, the timing of the exposure is obtained by successively releasing the shutter elements and this is accomplished by the timing device. For each exposure cycle the spring which motivates the timing device must be wound and this is done by a sliding plate member 32 which also performs the function of moving the shutter elements into position for initiating the exposure cycle. The plate 32 is guided to move longitudinally of the camera body. This may be done in any suitable manner such as that shown in the drawings wherein the plate is provided with a pair of studs 33, the headed portion of which slide within slots 34 formed in a fixed part of the camera body.

The plate 32 is provided with a rigid stud 35 which engages a projecting ear 36 upon the shutter element 16. When the plate 32 is actuated by the operator in a manner to be described, the element 16 is moved against the spacers 30 and 31 which in turn move the element 17 into its cocked or reset position at which time the element 16 closes the lens aperture and is latched.

The plate 32 is also provided with a timer rewind pawl 37 pivoted thereon and extending into a position where it engages one of the four short similar studs 38 equally spaced around the center of a rewind gear 39. The gear 39 is rotatably mounted on a fixed portion of the camera body and meshes with a timer pinion 40 which is rigidly connected to and drives the timer wind-up mechanism. When the sliding plate 32 is actuated the pawl 37 engages one of the studs 38 and revolves gear 39 one quarter of a revolution. This movement of the gear 39 is calculated to produce a full revolution of the timer pinion 40 plus a slight over travel for latching.

Figure 5:
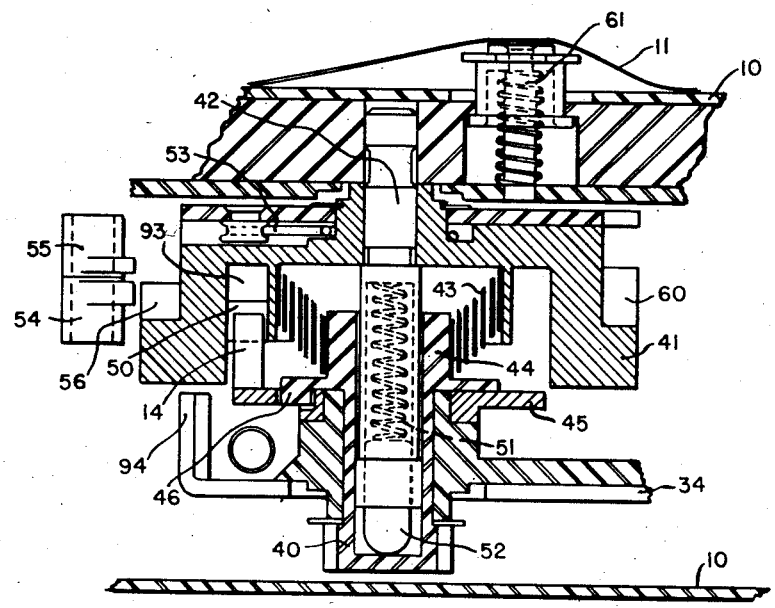
Fig. 5 is a vertical cross-sectional view through the timing mechanism.

The timing device consists essentially of a rotatable inertia device which will be termed the inertia means or flywheel 41 freely rotatable upon a shaft 42 which in turn is supported in the camera body as shown in Fig. 5. The flywheel 41 receives its power from a flat coil spring similar to a clock spring 43 one end of which is secured to the inner periphery of a spring receiving cup formed integrally with the flywheel. The other end of the spring 43 is secured to the pinion sleeve shaft 44 connected to the pinion 40 and projecting into a cylindrical concentric chamber within the flywheel.

A complete exposure cycle of the mechanism includes a full 360° rotational movement of the flywheel 41 and since the rotation of the pinion 40 and shaft 44 acts thru a projecting single revolution tongue 14 which in its unwound position bears at one side against a single revolution stop 50 and in its wound position bears against the other face of the single revolution stop 50 there will always be a few degrees discrepancy in the wind-up cycle which is undesirable.

To overcome the above condition the sleeve shaft 44 is loosely connected to a disc 45 which is freely rotatable upon the axis of the shaft 42. The sleeve shaft 44 is provided with a driving stud 46 which enters a recess in the disc 45. This recess is larger than the stud 46 to permit a few degrees of relative motion between the sleeve shaft and the loose disc 45. When a spring winding cycle is started the lost motion between 44 and 45 is taken up. At the completion of the wind-up cycle the single revolution tongue on the sleeve shaft 44 does not quite touch the back of the internal revolution stop 50 on the flywheel. If this lost motion were not present the mechanism would become jammed and a full revolution of the sleeve shaft would not be permitted. But with the provision of lost motion a complete 360° winding operation is possible.

During the winding operation the flywheel 41 is held against rotation by means of a stop 48 which remains in a fixed position radially with respect to the axis of the flywheel. This stop, however, has another function which will be described hereinafter. The flywheel is provided with a single revolution tongue 49 projecting outwardly from its periphery. The tongue 49 engages the stop 48 to normally hold the flywheel from rotation. The flywheel also is provided with a plurality of tongues projecting from its periphery which co-act with and operate a pair of latches which in turn act to withhold and release the members of the shutter in timed sequence to produce the desired exposure. The operation of the latter tongues is closely related to the manner and means for releasing the timer by the operator.

The shutter releasing means comprises a plurality of releasing buttons projecting a short distance outwardly from the camera case.

The flat face of the flywheel is situated closely adjacent to the wall of the camera body within which the shutter release buttons are located so that the depression of the buttons engages the flywheel forcing it axially along the shaft 42 against the action of a compression spring 51 which desirably is located within a cylindrical recess within the shaft 42. One end of the spring engages the end of the cylindrical recess while the other end of the spring engages a plunger 52 slidably located within the shaft and projecting outwardly therefrom to engage a wall at the end of the cylindrical opening in the sleeve shaft 44. The spring 51 thus acts to hold the flywheel in its extreme upper position as shown in Fig. 5. However, when one of the releasing buttons is depressed the flywheel moves along its axis and its external single revolution tongue 49 moves out of engagement with the stop 48 thus permitting the flywheel to rotate under the action of the clock spring 43.

The upper face of the fly wheel adjacent to the buttons 50 is of special construction and is provided with a plurality of arc shaped slots of varying length. Each of these slots is positioned at a different distance from the axis of the fly wheel and is arranged to cooperate with the actuating buttons which are also situated respectively at corresponding distances from the axis of the timer so that each button cooperates with one of the slots only. This arrangement of slots and buttons is illustrated diagrammatically in Fig. 4. Desirably, the arc shaped slots are formed in a disc rotatably mounted on the face of the flywheel. This disc can rotate in a short arc with respect to the fly wheel and such relative movement is controlled by a cushioning spring 53 coacting with a stud secured to the disc and extending into a recess in the fly wheel. In this manner the sudden stopping of the fly wheel due to the entrance of one of the buttons into its slot is softened thereby reducing the noise and vibration which would otherwise occur.

The arc shaped slots above described are so placed with respect to the timer axis that they will coact with one of the release buttons only and they are also located at different angular positions with respect to the one revolution stop 49. In the specific camera described the timer provides a 1/15 second, a 1/125 second, a 1/500 second and a bulb control for the shutter. The 1/15 second and the 1/125 second exposures are timed by the fly wheel as follows. The actual measurement of the timing of the exposure is imparted to the shutter itself thru the medium of a pair of latches 54 and 55 which normally respectively hold the shutter sections in cocked position. The latches each have a tail portion projecting in the path of projections or tongues 56 and 57 on the periphery of the fly wheel.

When the 1/15 second button 58 is pressed the fly wheel starts to rotate and very soon thereafter the inner end of the button enters the slot 59. When this occurs the fly wheel is pushed back to its normal plane by the spring 51 and the fly wheel continues to move while the pin traverses the slot and is finally stopped when the pin reaches the end of the slot. At this time the fly wheel has traveled about 45° of its total 360° cycle. At this time also the tongue 56 on the fly wheel is positioned in the path of the latch 55 but the tongue has not traveled far enough to engage the latch.

To initiate the exposure the button 58 is released which permits the fly wheel to rotate thruout the remainder of its cycle. At the start of this movement the tongue 56 is closely adjacent the latch 54 and immediately the tongue acts to unlatch the shutter section 16. It should be noted that at this time the speed of the fly wheel is just commencing to accelerate. Consequently, the measured period of the exposure is relatively long. The fly wheel continues and subsequently the tongue 57 ineffectively again actuates the latch 54 and very shortly after this the latch 55 is engaged by another tongue 60 on the fly wheel. This tongue will hereinafter be called the clear-out tongue 55 which is made wider than the other tongues so that it will engage the latch 55 which is in a plane offset from that of the latch 54. Thus, the section 17 of the shutter is now released thereby closing the camera aperture after which the one revolution tongue 49 strikes its stop 48 to end the cycle. Thus, for the 1/15 second exposure a substantial portion of the effective inertia of the fly wheel is utilized to prolong the exposure period.

For the 125th second exposure the button 61 is depressed causing the fly wheel to rotate until the button enters the slot 62 and subsequently the fly wheel comes to a rest when the button reaches the end of the slot. This first portion of the cycle causes the fly wheel to rotate about 180°. It will be noted, however, that due to the calculated length of the slot 62 there is a considerable rotation of the fly wheel before the button enters the slot. During this time the tongue 56 has by-passed the latch 55 because the fly wheel is still forced out of its normal plane with respect to the latches. When the button reaches the slot 62, however, the fly wheel is restored to its normal active plane.

The actual exposure is then accomplished by releasing the button 61 which causes the fly wheel to continue its rotation and at this time it travels thru a relatively large angle before the tongue 57 strikes the latch 54 to open the shutter 16. At this instant the fly wheel is accelerated to a relatively high velocity and passes very quickly from its position where the shutter is open to the position where the clear-out tongue 60 strikes the latch 55 causing the element 17 of the shutter to close the lens aperture. Tongue 60 also ineffectually strikes latch 54. In this manner the relatively short 1/125 second exposure is measured after which the fly wheel moves to its final position with the tongue 49 engaging the stop 48.

The 1/500 second exposure is obtained in a different manner. The actuation of the two sections of the shutter 16 and 17 successively by the fly wheel would be too slow. Therefore, to attain the necessary speed a true focal plane action is utilized.

When the 1/500 second button 63 is depressed the fly wheel is held down for almost a complete revolution and comes to rest by reason of the engagement of the external one revolution tongue 49 with a special fixed stop 64. This stop 64 is so positioned that the fly wheel will be stopped thereby only when it is in its lower plane, it being held in that position by the button 63. This stop is so positioned that the fly wheel comes to rest at an angular position such that the clear-out tongue 60 is positioned closely adjacent to and in front of the latches 54 and 55.

The 1/500 second exposure is then accomplished by releasing the button 63 at which time the fly wheel will unlatch both latches 54 and 55 simultaneously thus causing the slot between the two shutter sections created by the spacers 30 and 31 to traverse the focal plane of the camera to make the exposure.

A feature of this portion of the mechanism resides in a means for obtaining a uniform exposure during the passage of the slot 65 across the picture format. The velocity of its travel is non-uniform since the shutter elements are constantly accelerating in velocity. At the start of the motion of the shutter the degree of exposure is governed by the normal width of the slot which is determined by the spacers 30 and 31. However, the actuating spring 19 connected to the shutter section 16 is provided with more tension than the spring 18. Therefore, the section 16 pulls away from the spacers thereby enlarging the slot as it traverses the focal plane. Thus, the wider opening of the slot compensates for the relatively greater velocity at the end of the exposure cycle.

It may not be clear how the latches 54 and 55 control the shutter. Referring to Figs. 3 and 4 it will be observed that each shutter section 16 and 17 is provided respectively with projecting ears 66 and 67 which coact with the latches normally to hold the shutter in cocked position. The tail portion of the latches are the same shape and size and are arranged in line, viewed as in Fig. 4, so that they may be properly actuated by the various tongues on the flywheel. Ears 66 and 67 may be the same ears as those thru which the wires 15 pass or they may be additional ears for engagement by the latches only.

To provide an efficient transfer of energy from the tongues on the fly wheel to the latches the tongues thereof are provided with faces 68 which provide a gradual transfer of energy from the fly wheel to the latch.

A further control of exposure is provided by a button for accomplishing bulb control of the shutter. To do this another shutter control button 69 is provided which functions in a similar manner to the timer buttons for 1/15 second and 1/125 second exposures. When the button 69 is depressed the fly wheel is held in its lower plane until the tongue 56 has by-passed the latch 54 after which the button 69 enters a slot 70. This slot 70 actually is a cutaway portion on the periphery of the fly wheel. After the button enters this slot the fly wheel again is moved back to its normal plane and comes to rest when the button 69 reaches the end of the slot. At this time the tongue 57 on the fly wheel has actuated the latch 54 to open the shutter 16. The exposure can then be prolonged to the desired time period by holding the button 69 downwardly in its depressed position. Upon release of the button the fly wheel continues its movement to the end of its cycle during which period the clear-out tongue 60 engages the latch 55 to close the shutter.

One of the special advantages of a camera embodying the structure disclosed above is its extremely small dimensions and light weight which provide maximum portability. Another use is that of taking pictures unobserved thereby enabling the operator to obtain pictures which might otherwise be unobtainable. In view of the latter use it may be desirable to camouflage the camera. To do this the specific camera described herein is made to resemble a pack of cigarettes. Normally, therefore, the lens opening should not be visible with the exception of the instant of exposure. Provision is therefore made to close the lens opening in the camera body by a means which is supplemental to the camera shutter itself. This means is employed to greatly enhance the camouflage effect and prevent light leakage.

The overall camouflage of the camera is carried out by enclosing the camera in a conventional simulated cigarette package as illustrated in Fig. 1. The package normally exhibits nothing to indicate the presence of the camera. All of the shutter control buttons are beneath the surface of the package and the operator must learn to operate the buttons by his sense of touch and the approximate knowledge of the position of the buttons beneath the cigarette package.

It may be desirable to provide a very small opening thru which to view an exposure counter. The counter mechanism will not be described herein since it constitutes the subject matter of an independent invention.

Specifically, the camera lens opening is normally closed by a pair of slidable members which will hereinafter be called lens capping members and are mounted for sliding movement in the plane of the wall 70 of the package 11. The lens capping members are mounted upon a pair of guide wires 72 in the same manner as that of the shutter elements above described and are arranged along the side of the timing mechanism opposite to that of the shutter. The relative position of the capping members and the shutter is best illustrated in Fig. 3.

Fig. 7 is a detailed perspective view looking toward the front showing the capping section 71 in position to clear the shutter for operation. Each of the sections where they are visible thru the opening in the package is decorated to follow the camouflage of the cigarette package. In this way when the shutter and capping sections are in reset position ready for taking a picture or when they are in the release position after the picture is taken the camera will be completely disguised. The movement of the capping sections is powered by a pair of coil springs 74 and 75 which are connected in series. The spring 74 is anchored at its outer end to the camera body while its other end is connected to section 73 of the capping means. The adjacent end of the spring 75 is also connected to the section 73 while the other end of spring 75 is connected to the section 71. The spring 74 has a greater tension than the spring 75. When the section 73 is released therefore, after it has been moved into reset position, it will overcome the tension of spring 75 and the section 73 will move into position to expose the lens as shown in Fig. 7.

Desirably, a cushion of rubber is provided to absorb the shock of contact when the capping section arrives at its open position. At the end of the exposure period measured by the timing device the section 71 is released and moves along its guiding wires under the action of the spring 75 and finally arrives in its lens capping position in contact with the adjacent side of the section 73. A strip of felt or other soft material is secured to the edge of one of the sections to provide a light tight joint between the two sections and to act as a silencing device.

The capping sections are controlled by the stop 48 shown diagrammatically in Fig. 4. The stop 48 acts as the external single revolution stop for the timer as above described and also functions to control the lens capping section. Figs. 8 and 9 illustrate the structure and operation of the combination stop and control latch member 48. Fig. 8 is a front elevation of the member 48 and its cooperating elements and in which the capping elements themselves are not shown but a pair of control tongues 78 and 79 secured thereto are shown in cross-section. Fig. 9 is an end elevation showing more or less diagrammatically the latch 48, a portion of the timer and the elements 71 and 73.

The latch 48 is pivoted upon a fixed point on the camera body and has a generally bell crank conformation. One of its arms extends substantially vertical and the other arm horizontally. Its vertical arm projects into a space between two cushioned bumpers 80 which limit its rotational movement in both directions. A spring 81 is connected to and tends to move the latch counter-clockwise. The lower or horizontal portion of the latch is provided with notches for latching the sections of the capping means.

The horizontal arm of the latch 48 is situated outside the path of movement of the tongues on the timer fly wheel. The vertical arm thereof is bent inwardly into a position where it will be engaged by the external single revolution tongue 49 on the flywheel when the flywheel is in its normal or uppermost position. As above described, when the flywheel is pushed downwardly by one of the releasing buttons, the flywheel is set free to rotate. When the timer and the shutter are in reset position ready to make an exposure the tongue 49 bears against the latch 48 with a pressure determined by the timer spring. This pressure is sufficient to overcome the tension of the spring 81. Thus the latch 48 is held in the dotted line position shown in Fig. 8. At this time the lower notch on the horizontal arm of the latch is in position to hold the tongue 79 on the capping element 73 which results in maintaining both capping elements in their reset position.

When any of the release buttons is depressed the tongue 49 moves away from the vertical arm of the latch 48 thus permitting the spring 81 to move the latch into its full line position thus releasing the capping element which has the tongue 79 secured thereto. This movement of the capping element 73 uncaps the lens shutter to permit taking the picture.

At this time also the horizontal arm of the latch 48 has moved into such position that it presents its upper notched portion into a position to catch and hold the tongue 78 on the capping section 71. To insure that the tongue 78 will be caught by the latch 48 the tongue 78 is normally held in its reset position a short distance away from the shoulder of the notch so that when the tongue 78 on the section 71 is released the tongue 78 must travel a short distance during which time the horizontal arm of the latch moves into the path of the tongue thus withholding the capping element 71. This action of the latch 48 is shown in full and dotted lines in Fig. 8.

By referring to the description above set forth of the action of the shutter it will be noted that for any of its exposure cycles that when the tongue 49 has completed 360° of movement the exposure cycle has been completely finished. Consequently, when the tongue 49 again engages the latch 48 any exposure cycle which may have been initiated has been completed. Obviously, also when the tongue 49 engages the latch, the latter will be moved into its dotted position thereby releasing the capping element 71 which functions to mask the lens. In other words, the period of time during which the capping elements uncover the lens will always entirely embrace the exposure period.

As above described when the sliding plate 32 is moved toward the left in Fig. 2 the various functions of the camera are reset and made ready for an exposure. This movement of the plate may be obtained in any suitable manner. However, it was considered desirable to follow the camouflage effect if possible. An effective means for accomplishing this result was obtained by providing a movable dummy cigarette. The cigarette was arranged to be released and project itself from the package after which it is used to cause the desired movement of the plate then it is again pushed into the package.

A simulated cigarette 85 is arranged to slide in and out of the camera body and extends thru an aperture in the camouflaged end of the scamera. Similar cigarettes may be arranged but are not shown herein to provide adjustment of the iris opening and to adjust the focus of the lens. Desirably, the cigarette 85 is received within aperture 86 in the camera body. The cigarette itself has an aperture extending substantially for its full length to form a hollow cylinder within which is received a hollow sleeve containing a spring 87 the expanding force of which acts to move the cigarette outward.

Normally, the cigarette is held in its inward position by a gravity actuated latch pin 88 which enters a notch 89 in the cigarette. To release the cigarette, slight pressure is exerted thereon with the camera in its inverted position at which time the latch pin disengages from the cigarette which is then projected outwardly by its spring. The camera is again righted and another gravity actuated pin 90 enters another notch in the cigarette. The latch pin 90 is received within a housing secured to the end of the sliding plate 32. When the cigarette is again depressed, therefore, it will move the plate inward thus resetting the camera for action. The cigarette is then allowed to extend itself outward after which the camera is then oriented to cause reverse action of the pins 89 and 90 and the cigarette is then pushed in where it becomes locked by the pin 88 engaging in the aperture 89.

The spring 91 is positioned remotely from the plate 32 to provide adequate space for it to function. The tension of the spring is transmitted to the plate by cord 92 secured to the spring and the plate through its connection to the pawl 37. Tension in the cord thus also acts to properly control the action of the pawl. To provide the proper application of the spring tension and its direction of pull the cord 92 passes over a pair of sheaves or any suitable directional device.

An interlock system is provided to prevent jamming of the camera mechanism which may result from improper actuation of its controls. For example, if successive actuation of the shutter occurs during any fractional part of an exposure cycle undesirable results may follow and means are provided that an abutment 93 is located in the timer spring cup adjacent to the internal single revolution stop 50. Referring to the previous description of the operation of the timer, it will be noted that at the end of the exposure cycle the internal single revolution stop 50 has engaged the tongue 14 of the disc 45 and caused it to move sufficiently to take up all of the backlash between the projection 46 on the wind-up pinion stud 30 and the aperture in the plate 45 within which it is received. At this time, therefore, the abutment 93 is situated above the end of the tongue 14. Thus, downward movement of the fly wheel is stopped which prevents depression of any of the release buttons. The abutment 93 thus serves as an interlock to prevent a second exposure before rewinding the shutter spring and advancing of the film. This interlock also prevents releasing the preload tension of the timer spring which might occur if a second shutter release was accomplished before rewinding the spring. There is, however, another condition when trouble could be caused by improper actuation of the release buttons and that is if such an actuation occurs during the wind-up cycle after the abutment 93 ceases to perform its interlock function. At this time a button could be pressed which would cause the undesired release and prewind tension in the spring. To prevent this a projection 94 is provided on the plate 32 which moves into position below the rim of the fly wheel before and while winding is taking place thus preventing actuation of the release button and moreover the effect of projection 94 overlaps that of the abutment 93.

It should be pointed out that the lens capping mechanism above described serves an additional purpose as follows. After an exposure has been made the two capping elements are held together and their adjoining edges form a light tight seal which excludes light from the lens during the resetting cycle of the camera and at all other times. If this were not so the newly advanced film would become exposed by the slot between the shutter elements as it passes across the focal plane.

The invention has many advantages in addition to those above pointed out. Its lens capping device provides an efficient means for excluding dust and foreign matter from the interior of the camera and affords protection of the lens from mechanical injury.

By covering the shutter actuating buttons with a flexible outer protecting sheet upon the camera body there results a further sealing of the camera against the entrance of foreign matter.

What is claimed is:

1. In a camera having a lens and a shutter to control the passage of light thru the lens; a timing device comprising a freely rotating inertia member, means to energize said inertia member, manual means for selecting a desired period of exposure, means on said inertia member coacting with said exposure selecting means to stop said inertia member after it has traveled a measured fraction of its total travel, means acting thereafter to permit said inertia member to complete its total travel, shutter actuating means adjacent said inertia member, means on said inertia member acting through said shutter actuating means to open and close said shutter during the final movement of said inertia member thereby to produce an exposure period measured by the extent and speed of travel of said inertia member during the second portion of its total movement.

2. In a camera having a lens and a shutter to control the light passing thru the lens; a timing device comprising a rotating inertia member, means to energize said inertia member thruout a total fixed angular travel thereof, a plurality of manually operated exposure selecting buttons actuation of each of which produces a different exposure, retracting means for said buttons, means on said inertia member coacting with said buttons to stop said inertia member at the end of a measured fraction of its total travel, said retracting means operable thereafter to permit said inertia member to complete its total travel, shutter control means adjacent said inertia member, timing projections on said inertia member engaging said shutter controlling means during the final movement of said inertia member acting to open and close said shutter to produce an exposure determined by conditions set up by the first cycle of movement of the inertia member.

3. In a camera having a lens and a variable speed shutter for controlling the passage of light thru said lens; a timing device for said shutter comprising an inertia member rotatable upon an axis, power means for driving said inertia member, a stop for limiting its rotation to a maximum of one revolution, a plurality of time measuring projections on said inertia member, a plurality of exposure selecting buttons having retracting means and coacting respectively with said projections said buttons operable when independently actuated to start said inertia member and by coacting with its respective stop to arrest the inertia member at a measured fraction of its total travel, said retracting means acting thereafter when the selected button is released to permit said inertia member to complete its total travel, shutter actuating tongues on said inertia member operable to open and close said shutter during the second cycle of its movement and means to render a selected one or more of said actuating tongues inoperative during the first cycle of movement of said inertia member.

4. In a camera having a lens and a shutter for controlling the passage of light therethru; a timing device for said shutter comprising a freely rotatable inertia member having a fixed maximum travel, a plurality of shutter actuating buttons, an exposure measuring a slot in said inertia member for each button coacting with each button to cause said inertia member to first rotate and then stop at a measured portion of its travel, means acting thereafter to cause said inertia member to complete its cycle of movement and means on said inertia member acting during the latter portion of its movement to open and close said shutter to produce an exposure the duration of which is established by the extent of the first motion of said inertia member.

5. In a camera having a lens and a shutter to control the passage of light therethru; a timing device comprising an axially movable rotary inertia member, a stop to limit its total rotary motion, a spring to energize said inertia means, a pair of shutter controlling latches normally holding the shutter closed, a plurality of tongues projecting from said inertia member and spaced along its periphery at positions calculated to measure desired periods of exposure, said tongues being also positioned normally to engage said shutter latches when said inertia member is rotated, a plurality of timer releasing means separately operable to move said inertia means axially thereby to release it from said stop and to hold it in a plane wherein selected tongues may by-pass said latches, means on said inertia member operable to return it to its normal plane and means on said inertia member coacting with one of said timer releasing means to stop its rotation at a measured fixed position constituting a fractional portion of its total travel and means to release said inertia means thereafter to permit it to complete its total travel and cause the tongues thereon not by-passed during its initial cycle of movement to open and close said shutter.

6. A camera having the elements defined in claim 3 in which the said shutter is a rigid type focal plane shutter having two slidable gate members one acting to open and one acting to close the lens opening.

7. A camera having the elements defined in claim 4 in which the said shutter is a rigid type focal plane shutter having two slidable gate members one acting to open and one acting to close the lens opening.

8. A camera having a lens and a shutter to control the light passing thru the lens; a timing device comprising an axially movable rotating inertia member, a spring to energize said inertia member, a second spring acting to hold said inertia member in a normally fixed plane, a stop acting to hold said inertia member against rotation when it is in its normal plane, a plurality of timer actuating buttons any one of which is operable to move said inertia member axially out of its normal plane thereby releasing it for rotation, said buttons having retracting means said inertia member having a plurality of spaced shutter actuating projections and a plurality of recesses varying in angular length and situated in different angular positions thereon, said recesses being arranged that one of said timer actuating buttons will coact with one of said recesses only, said button acting to hold said inertia member out of its normal plane for a period determined by the peripheral position of its coacting recess and when said recess reaches said button said inertia member is returned to its normal plane and when the end of the slot is reached acting to arrest the rotation thereof which completes the first cycle of movement of said inertia member said button retracting means acting thereafter to again release said inertia member permitting it to complete its total cycle of movement, said projections on the inertia member acting during the final movement thereof to open and close said shutter to produce an exposure the duration of which is determined by the relative position of said projections and the preselection of those projections made during the first cycle of movement of the inertia member while it was held out of its normal plane.

9. In a camera having a lens and a focal plane in which to position sensitive material; a shutter comprising a pair of rigid gate members, means to guide said gate members closely adjacent to the camera's focal plane, spring means to move said gates to open and close the aperture of said lens, latches independently to hold and release said shutter gates, a rotatable inertia member for timing said shutter and having a fixed total travel, means to drive said inertia member, manual means operable to start and selectively stop said inertia member at the end of a fractional part of its total travel, projections on said inertia member positioned at measured angular distances adjacent the periphery thereof said projections being situated to engage said latches, retracting means on said manual means operable to again start said inertia member to complete its total travel during which time said projections or a number thereof determined by the extent of the first movement of said inertia member successively to operate said shutter gates to time the exposure.

10. In a camera having a lens and a focal plane in which to position sensitive material; a variable speed shutter, inertia means to time said shutter, manual tripping means for starting said inertia means, control means for said inertia means coacting with said manual means selectively to stop said inertia means at the end of a predetermined fraction of its total travel, means on said tripping means acting thereafter to again start said inertia means to permit it to complete its timing cycle, projections on said inertia means operable during the latter portion of its travel to actuate said shutter thereby to affect a selected exposure period, automatic lens capping means outside of said lens and means connected to and operated by said inertia means acting to uncap said capping means before the beginning of any exposure period and capping the lens at the end of the exposure period.

11. In a camera having a lens and a focal plane in which to position sensitive material; a variable speed shutter, a rotating inertia member for timing said shutter, spring means to energize said inertia member, a pivoted stop acting to hold said inertia member in its normal inactive position, said pivoted stop having a first and a second position and being held in its first position by engagement of said inertia member therewith and moving into a second position and when said inertia means is released, manual tripping means for disengaging said inertia member from said pivoted stop to start said inertia member, control means coacting with said tripping means for selectively stopping said inertia member at a predetermined fraction of its total travel, means on said tripping means operable thereafter to permit said inertia member to complete its timing cycle, means on said inertia member operable to actuate said shutter to produce an exposure the duration of which is based upon the annular travel of said inertia member during its final movement, automatic external lens capping means normally held inoperative by said pivoted stop, said pivoted stop acting while moving into its second position when said inertia means is started to uncap said lens and to recap said lens when the inertia means has completed its timing cycle and has moved said pivoted stop into its first position.

12. A camera having the elements defined in claim 11 and in which said lens capping means includes a pair of rigid gate members moving in a plane closely adjacent to the outer wall of the camera and acting to open and close an aperture therein.

13. A camera having the elements defined in claim 12 and in which the camera mechanism is inclosed in a camouflage covering and in which each rigid member of said lens capping means has markings thereon which match and complete the camouflage on said covering.

References Cited in the file of this patent

UNITED STATES PATENTS

| | | | |
|---|---|---|---|
| 709,079 | Donitz | Sept. 6, | 1902 |
| 1,117,637 | Colardean et al. | Nov. 17, | 1914 |
| 1,304,673 | Folmer | May 27, | 1919 |
| 1,311,447 | Holst et al. | July 29, | 1919 |
| 2,140,446 | Mihalyi | Dec. 13, | 1938 |
| 2,218,252 | Stoiber | Oct. 15, | 1940 |
| 2,238,499 | Mihalyi | Apr. 15, | 1941 |
| 2,371,072 | Simmon et al. | Mar. 6, | 1945 |
| 2,464,067 | Barker | Mar. 8, | 1949 |
| 2,495,223 | Bodlander | Jan. 24, | 1950 |
| 2,608,921 | Studdert | Sept. 2, | 1952 |

FOREIGN PATENTS

| | | | |
|---|---|---|---|
| 3,896 | Great Britain | of | 1896 |
| 410,306 | Great Britain | May 17, | 1934 |
| 969,275 | France | May 17, | 1950 |